United States Patent Office 3,621,675
Patented Nov. 23, 1971

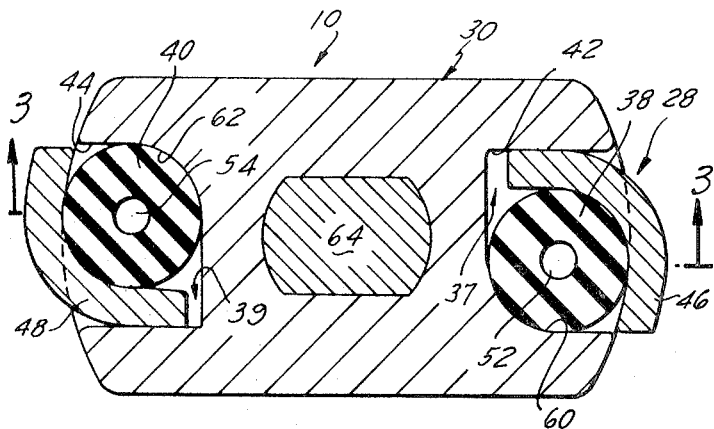
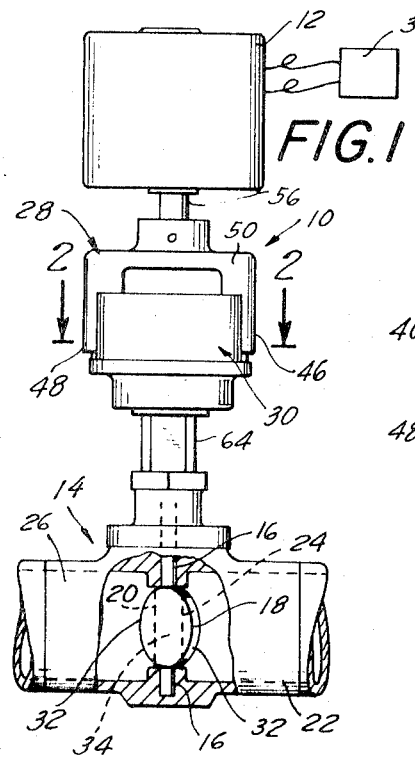
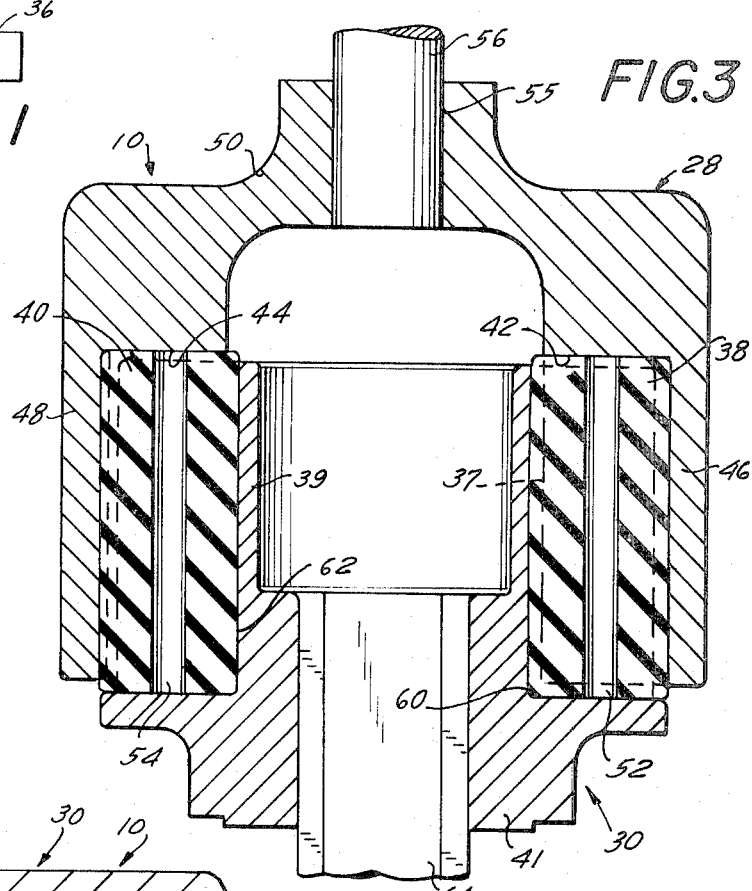
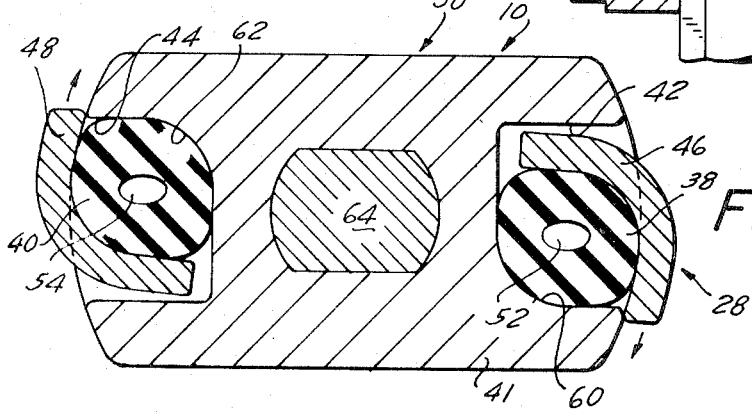

3,621,675
FLEXIBLE COUPLING DEVICE
Daniel J. Conaghan, Franklin, Robert W. Matthews, Norwood, and Brendon V. Tully, Dracut, Mass., assignors to Holtzer-Cabot Corporation, Boston, Mass.
Filed Apr. 13, 1970, Ser. No. 27,813
Int. Cl. F16d 3/64
U.S. Cl. 64—14                                         7 Claims

ABSTRACT OF THE DISCLOSURE

A coupling device comprises a driving member having a driving part extending outwardly therefrom, a driven member having a receiving section, and a resilient member such as an elongated tube positioned in the receiving section and engaged by the driving part of the driving member. When moving between first and second positions, the driving part compresses the resilient member and forces it against the driven member. The resilient member is composed of a compressible but sturdy material such as neoprene and is effective to transmit the driving force to the driven member, causing the driven member to also move. When the driven member reaches its seated or second position it is positively stopped. The driving member continues to move to reach its second position, compressing the resilient member. The driven member is thus resiliently held in its second position, wear of the second member and/or its seat is compensated for by expansion of the resilient member, and the driving member overtravel positively ensures actuation of external limit stops or the like.

---

This invention relates to coupling devices, and more specifically to a coupling device which includes a resilient member adapted to be compressed and to expand during the operation of the device.

Coupling devices are typically employed in a wide variety of mechanical systems. Generally, such devices comprise a driving member operatively connected to a driven member, both the driving member and the driven member being separately attached to different parts in the system. Movement of the driving member by the driving part to which it is attached is transmitted to the driven member and that part of the system operatively connected to the driven member is therefore actuated synchonously with the driving part of the system.

Very often the driving member of the coupling device is attached to a component such as a motor which drives to a specific position and there stops. The driven member is attached to a driven means such as a valve member which also may be driven only a specific distance before it stops. One specific example of such a system is an automatically operated gate valve positioned in a fluid flow system and opened or closed through a coupling device by a servo motor. It is important in this type of system that the complete closure of the valve occurs simultaneously with the deactuation of the servo motor, the latter occurring at a predetermined point in the operation of the system, usually through actuation of a limit switch by the driving member. Thus the coupling device must reliably transmit the movement of the motor to the valve with substantially no lost motion.

One major difficulty adversely affecting the proper operative actuation of components in this type of system is the wear which occurs between valve parts after continuous operation thereof for extended periods. When such wear occurs the driven valve closure part must be moved an additional distance in order to effect a complete seal. However, this requires that the stop position of the servo motor, which is generally controlled by the aforementioned limit switches, be frequently adjusted to compensate for such wear. Obviously, such adjustments in an operating system are time-consuming and costly, often requiring system shut-down. However, there is currently no other satisfactory solution to this problem, and such action must be taken for the continued proper operation of the system.

It is the primary object of this invention, therefore, to provide a coupling device which is capable of automatically compensating for wear of the driven means to which it is attached.

It is another object of this invention to provide a coupling device which is characterized by excellent driving force transmitting properties, reliable operation over extended operating periods, positive limit stop actuation, and ability to adjust the position of the driven member automatically in response to the demands of the system.

The aforementioned problems are solved by a very simple and highly reliable coupling device. The device comprises a driving member, a driven member and a resilient member interposed therebetween. The driving member forces the resilient member against the driven member during the operation of the coupling device, and thereby transmits the driving force to the driven member. During the application of such force the resilient member is compressed by a predetermined amount and is held in its compressed condition during application of the force until the driven member reaches it stop position. If the driving member simultaneously reaches its stop position, then the resilient member remains compressed between the two members in the coupling device by said predetermined amount. If, however, the driving member has some overtravel before reaching its stop position after the driven member reaches its stop position, as is preferred in this system, then the resilient member is compressed further. If the driven member or the part against which it is pressed when in its stop position should wear, the compressed resilient member automatically expands and drives the driven member an additional incremental distance sufficient to move it to its seated stop position. Thus, in a typical application, a servo motor is actuated to drive the coupling device and rotates to a specific position at which a sensing means such as a limit switch turns off the motor. The driven member such as a valve is then resiliently urged against its seat, and that resiliency provides automatic compensation for wear of the valve or seat.

In the preferred embodiment the driving member of the coupling device comprises a base part and a pair of projecting arms extending outwardly from the base. The driven member comprises a base part and a pair of outwardly extending parts each provided with a receiving section such as a receptacle. The arms of the driving member are arcuately shaped so as to partially fit within these receptacles when the members are joined and engage a pair of resilient cylindrical members which are placed on in each receptacle. The two arms, the receptacles, and the resilient members are positioned on opposite sides of the coupling device, so that when a rotary force is applied to the driving member, the torque generated thereby is transmitted at two locations through the resilient members to the driven member. Preferably, the resilient members are elongated tubes with an opening extending through the central portion thereof over the entire length. These members are composed of an elastomeric material of a suitable hardness capable of being compressed by the driving arms upon the application of a driving force and of transmitting that driving force to the driven member.

To the accomplishment of the above, and to such other objects as may hereinafter further appear, the present invention relates to a flexible coupling device as defined in the appended claims, and as described in the accompanying drawing in which:

FIG. 1 is a side elevational view of a coupling device in a typical driving system;

FIG. 2 is a cross sectional view of the coupling device illustrated in FIG. 1, taken on the line 2—2 of FIG. 1;

FIG. 3 is an enlarged partial cross sectional view of the coupling device illustrated in FIG. 1, taken on the line 3—3 of FIG. 2; and FIG. 4 is an illustration similar to that of FIG. 2, but with the resilient members in a compressed condition.

Referring to FIG. 1, a coupling member 10 typical of the invention is illustrated in position between a driving means such as servo motor 12 and a driven means such as the valve 14. The valve 14, which is most clearly illustrated in the broken portion at the lower part of FIG. 1, comprises a valve shaft 16, a valve gate 18, and a valve seat 20. The valve 14 is here shown as a gate valve in a fluid flow system, but may comprise any kind of closure device in any number of suitable systems.

The valve passes a fluid from a conduit 22 through the opening 24 to the conduit 26 when it is in the position shown in FIG. 1. The fluid is prevented from passing through the opening 24 into the conduit 26 when the valve disc 18 is pressed against the valve seat 20. This occurs when the shaft 16 and thus the disc 18 are rotated approximately 90° from the illustrated position. Such rotation is effected through the coupling device 10 which transmits the necessary force from the motor 12. The rotary movement is transmitted within the coupling device from the driving member 28 to the driven member 30 and to the shaft 16 connected thereto.

After extended periods of valve operation, the surface 32 of the valve disc 18 will wear against the surface of the valve seat 20, or vice versa. When this occurs the complete closure of the valve, that is, the tight engagement of the valve gate 18 with the valve seat 20, does not occur unless an adjustment is made to compensate for the additional driving distance needed to close the valve. The servo motor 12 cannot drive that additional distance because it is deactuated automatically by the limit switch 36 after it drives to a specific position. That specific position is initially set to coincide with the complete closure of the valve 14 when there is no wear in the valve. However, after wear of the valve surfaces has occurred, the servo motor 12 will be deactuated before the valve is able to completely close. Normally, in such a situation, the limit switch 36 must be reset to permit the servo motor to drive the additional distance. However, the coupling device 10 of the invention is designed to automatically drive the valve disc 18 the additional incremental distance required to effect a complete closure of the valve under these conditions, thereby eliminating the need for such an adjustment.

The structure of the coupling device 10 which accomplishes this result is best shown in FIGS. 2, 3 and 4. As there illustrated resilient members 38 and 40 are interposed between the driving member 28 and the driven mmeber 30 of the coupling device 10. Specifically the resilient members 38 and 40 are positioned in sections 37 and 39 of the driven member 30 which sections extend outwardly from the base 41. These members 38 and 40 rest in the receptacles 42 and 44 which are part of the extended sections 37 and 39 respectively. The driven member 28 is similarly configured, having elongated arcuately shaped arms 46 and 48 extending outwardly from the base part 50. These arms 46 and 48 are partially positioned within the receptacles 42 and 44 and engage a part of the surface of the resilient members 38 and 40.

The resilient members 38 and 40 are here illustrated as elongated cylindrical tubes composed of a sturdy compressible material. Each of the members 38 and 40 is provided with a centrally located hole 52 and 54 respectively. These holes extend axially of the tubular members over the entire length thereof. The compression of the members 38 and 40 during the operation of the coupling device is facilitated by the use of these holes 52 and 54. Such a structure enables these members 38 and 40 to be composed of a relatively hard material so that the transmission of the driving force may be transmitted from the driving member 30 without affecting the necessary compressive character of the members.

In the operation of the system the servo motor 12, when actuated, causes the driving member 28 to rotate since this member 28 is connected at 55 to the output shaft 56 of motor 12. The arms 46 and 48 are integrally joined to the base 50 of the driving member 28 and they are therefore also rotated in response to the movement of the shaft 56. In the illustrated embodiment, the rotation is carried out in the direction of the arrows as shown in FIG. 4. The movement of the arms 46 and 48 in that direction causes the resilient members 38 and 40 to be compressed somewhat against the inner walls 60 and 62 respectively of the driven member 30 as shown in FIG. 4. The members 38 and 40 are effective to transmit the driving force to the driven member 30, and this member is therefore also rotated in the same direction. As a result the valve shaft 16 and the valve gate 18 connected to the driven member 30 through the shaft 64, are rotated toward the valve seat 20 from the position shown in FIG. 1. Eventually the valve gate 18 will engage the seat 20. The servo motor 12 will continue to rotate until it is deactuated by the limit switch 36. This will cause further compression of the resilient members 38 and 40, thereby resiliently urging the gate 18 against the seat 20.

The resilient members are constructed to have a suitable shape and diameter for expansions of varying amount. One satisfactory structure is a cylindrical member 2⅛ inches long and 1 inch in diameter, with a centrally located hole ½ inch in diameter. This member may be composed of neoprene having a durometer hardness of 80. In one system two such members were positioned as shown in FIGS. 2 to 4, were compressed 1/16 inch during the operation of the device, and expanded a lesser distance to compensate for wear of the valve to which the coupling device was attached. Wear-compensating expansion of up to 1/32 inch is sufficient for most installations.

The particular embodiment illustrated represents a coupling device which drives in only one direction. Thus, when the servo motor is reversed and the valve is opened, the expansive and compressive action of the resilient member is of no consequence. However, the coupling device may easily be modified to include additional resilient members which, when properly positioned, will function in the same way as the first two resilient members to drive a device in the opposite direction. As an example of such a structure, the driving member and the driven member of the coupling device illustrated in the drawing may be provided respectively with a pair of opposed outwardly extending arms and receptacle sections positioned approximately 90° from those which are illustrated. These arms are effective to compress resilient members when the servo motor reverses itself. With this arrangement, a single coupling device when rotating in a clockwise direction closes one valve and opens another. When rotating in a counterclockwise direction, it opens the first valve and closes the second. Obviously by a proper arrangement of the coupling device structure even a larger number of valves can be similarly operated.

Moreover, the principles of the coupling device of the invention are applicable to coupling devices which may be employed with driving systems other than a torque generating system such as a servo motor. If, for example, a coupling member is required to connect a linear motion driving means such as a piston to a driven means, the resilient member interposed between the driving member and the driven member in such a coupling device may readily be designed and positioned so as to compress and expand in response to the movement of the pistons in a manner and with the results before described. It is also apparent therefore that the number and design of the resilient members will vary with the type of coupling device employed.

From the foregoing it will be appreciated that the coupling device of the invention solves an important problem compensation for which heretofore required a shutdown of the system in which the coupling device functions. The coupling device is capable of automatically adjusting to compensate for the wear normally occurring between engaging parts in a valve or the like to which the coupling is attached. Readjustment of limit switches in the system, such as those employed to control a servo driving means, is no longer necessary since the coupling device is self-adjusting. Furthermore, fine adjustment of the limit switches, formerly required, may now be eliminated because the coupling device is inherently capable of adjusting for the tolerances which may prevail if such fine adjustment is eliminated. The coupling device solves the aforementioned problems with a simple structure readily adapted to economical production on a large scale.

While only one embodiment of the invention has been illustrated, it will be apparent that other modifications may be made without departing from the scope of the invention as defined in the following claims.

We claim:

1. A coupling device for transmitting a driving force from a driving means to a driven means and for automatically compensating for wear in the driven means, comprising a driving member having a driving part extending therefrom adapted to produce a driving force upon the movement thereof between a first position and a second position, a driven member having a receiving section therein positioned adjacent said driving part, and resilient means positioned in said receiving section of said driven member and engaging said driving part of said driving member, said resilient means being effective to transmit the driving force of said driving part to said driven member when said driving part moves between said first and second positions, to be compressible by said driving part when said driven member is positively stopped and to be expandable from said compressed condition when wear in said driven means occurs, said driven member receiving section having a laterally outwardly opening recess within which said resilient means is positioned, said driving member having a portion extending radially outside said driven member, said driving part extending generally radially inwardly from said portion into said recess via said lateral opening thereof there to operatively engage said resilient means.

2. The coupling device of claim 1, in which said driving member portion registers with and substantially closes said laterally outwardly opening recess.

3. The coupling device of claim 1, in which said driven member has a pair of laterally outwardly opening recesses in which said resilient means are positioned, said driving member having a pair of said portions each having a said driving part extending therefrom into a different one of said recesses.

4. The coupling device of claim 3, in which said driving member portions register with and substantially close said laterally outwardly opening recesses respectively.

5. The coupling device of claim 2, in which said driving member comprises a base with said portions extending generally axially from said base and said driving parts extending generally radially from said portions.

6. The coupling device of claim 5, in which said resilient means comprises elongated tubular members, one in each of said recesses, said tubular members having an opening extending axially thereof, said driving parts being arcuately shaped and engaging the outer surface of said resilient members within said recesses.

7. The coupling device of claim 2, in which said resilient means comprises elongated tubular members, one in each of said recesses, said tubular members having an opening extending axially thereof, said driving parts being arcuately shaped and engaging the outer surface of said resilient members within said recesses.

References Cited

UNITED STATES PATENTS

| | | | |
|---|---|---|---|
| 2,012,012 | 8/1935 | Kitzman | 64—27 |
| 2,703,991 | 3/1955 | Kron et al. | 64—27 |
| 2,729,442 | 1/1956 | Neidhart | 64—14 X |
| 3,308,637 | 3/1967 | Deuring | 64—13 |
| 3,345,831 | 10/1967 | Boole | 64—14 |

KENNETH W. SPRAGUE, Primary Examiner

U.S. Cl. X.R.

64—27 NM